US012441141B2

(12) United States Patent
Mangone et al.

(10) Patent No.: US 12,441,141 B2
(45) Date of Patent: *Oct. 14, 2025

(54) TYRE COMPRISING A PIEZOELECTRIC DEVICE

(71) Applicant: Apollo Tyres Global R&D B.V., Enschede (NL)

(72) Inventors: Carmela Mangone, Enschede (NL); Michel Klein Gunnewiek, Enschede (NL); Louis Reuvekamp, Enschede (NL)

(73) Assignee: Apollo Tyres Global R&D B.V., Enschede (NL)

( * ) Notice: Subject to any disclaimer, the term of this patent is extended or adjusted under 35 U.S.C. 154(b) by 298 days.

This patent is subject to a terminal disclaimer.

(21) Appl. No.: 17/760,689

(22) PCT Filed: Sep. 15, 2020

(86) PCT No.: PCT/EP2020/075760
§ 371 (c)(1),
(2) Date: Mar. 15, 2022

(87) PCT Pub. No.: WO2021/052957
PCT Pub. Date: Mar. 25, 2021

(65) Prior Publication Data
US 2022/0402312 A1 Dec. 22, 2022

(30) Foreign Application Priority Data
Sep. 16, 2019 (LU) ........................................ 101395

(51) Int. Cl.
*B60C 23/00* (2006.01)
*B60C 1/00* (2006.01)
(Continued)

(52) U.S. Cl.
CPC ........ *B60C 23/0411* (2013.01); *B60C 1/0008* (2013.01); *C08K 3/04* (2013.01);
(Continued)

(58) Field of Classification Search
CPC ............ B60C 2019/004; B60C 23/041; B60C 1/0008; B60C 23/0411; B60C 1/00
See application file for complete search history.

(56) References Cited

U.S. PATENT DOCUMENTS 5,869,189 A    2/1999   Hagood et al.
5,879,757 A *   3/1999   Gutowski ................. C08J 7/12
                                                 427/601

(Continued)

FOREIGN PATENT DOCUMENTS

CN       107672388     *   2/2018
CN       208180681 U    12/2018
(Continued)

OTHER PUBLICATIONS

International Search Report and Written Opinion related to Application No. PCT/EP2020/075760 mailed Nov. 30, 2020.
(Continued)

*Primary Examiner* — Justin R Fischer
(74) *Attorney, Agent, or Firm* — Renner, Otto, Boisselle & Sklar, LLP

(57) ABSTRACT

The present invention relates to a vehicle tyre comprising a piezoelectric device, wherein the piezoelectric device comprises a layer of a piezoelectric polymer having first and second opposing sides, and a first and a second layer of conductive rubber provided adjacent to the first and second opposing sides of the layer of piezoelectric polymer.

13 Claims, 2 Drawing Sheets

(51) Int. Cl.
  *B60C 23/04* (2006.01)
  *C08K 3/04* (2006.01)
  *C08L 9/00* (2006.01)
(52) U.S. Cl.
  CPC ............... *C08K 3/041* (2017.05); *C08L 9/00* (2013.01); *C08K 2201/001* (2013.01); *C08K 2201/011* (2013.01)

(56) References Cited

U.S. PATENT DOCUMENTS

| | | | |
|---|---|---|---|
| 6,992,423 | B2 | 1/2006 | Mancosu et al. |
| 8,035,502 | B2 | 10/2011 | Heise et al. |
| 11,766,842 | B2 * | 9/2023 | Seto ............... B60C 5/14 152/510 |
| 2004/0164558 | A1 * | 8/2004 | Adamson ............... B60C 19/08 290/1 R |
| 2005/0110277 | A1 | 5/2005 | Adamson et al. |
| 2007/0010928 | A1 * | 1/2007 | Brusarosco .......... G01G 19/025 340/444 |
| 2009/0302714 | A1 | 12/2009 | Kim |
| 2013/0127299 | A1 | 5/2013 | Kim et al. |
| 2018/0337417 | A1 | 11/2018 | Kyu et al. |
| 2019/0252596 | A1 | 8/2019 | Akimoto et al. |

FOREIGN PATENT DOCUMENTS

| | | | |
|---|---|---|---|
| EP | 1598219 | A2 | 11/2005 |
| EP | 1650057 | A2 | 4/2006 |
| EP | 1993857 | B1 | 10/2016 |
| EP | 3401363 | A2 * | 11/2018 ......... B29D 30/0654 |
| JP | 2013-21176 | * | 1/2013 |
| KR | 20060128360 | A | 12/2006 |
| KR | 101668104 | B1 | 10/2016 |
| KR | 20190029829 | A | 6/2019 |
| WO | 2017010135 | A1 | 1/2017 |
| WO | WO-2018142901 | A1 * | 8/2018 ......... B29D 30/0681 |

OTHER PUBLICATIONS

Indian Office Action for corresponding Application No. 202217012464, issued Dec. 18, 2023, with English translation.

* cited by examiner

TYRE COMPRISING A PIEZOELECTRIC DEVICE

This application is a national phase of International Application No. PCT/EP2020/075760 filed Sep. 15, 2020, which claims priority to Luxembourg Application No. LU101395 filed Sep. 16, 2019, the entire disclosures of which are hereby incorporated by reference.

The present invention relates to a vehicle tyre comprising a piezoelectric device.

Autonomous driving has been changing the modern transportation system and is expected to bring several benefits, for instance driverless driving, accident reduction and fuel savings. A crucial role for the progress of autonomous driving play sensors, which will provide real-time information on tread wear, load detection, temperature and pressure. For this reason, an increasing number of wireless sensors are being integrated into a vehicle and the research is investigating the issues correlated to automatic operation and the limited capacity of batteries powering the sensors.

TPMS, Tyre Pressure Monitoring System, is one of the first sensors introduced into the tyres to monitor the tyre pressure continuously. The Tread Act made the presence of this sensor obligatory for tyres fitted on all light vehicles sold in the USA from 2007. The necessary presence of the TPMS in vehicles was also adopted by the European Union in 2009 with the regulation 661/2009. A TPMS sensor can be installed either on the wheel rim or on the inside of the tread of the tyre. These TPMS systems consist of a pressure sensor, a circuitry and a battery. The circuitry includes a controller and a transmitter in order to control and send the signal to the central system of the vehicle, which in turn warns the driver about the presence of under or over-inflated tyres. Existing TPMS sensors require a battery as power supply. Alternative solutions to deliver the power for the TPMS are desired due to several drawbacks of a battery, such as a limited lifetime, high maintenance costs for replacing depleted batteries and the environmental impact due to the usage of toxic heavy metal. A self-powered TPMS can overcome these disadvantages, exploiting the cyclic mechanical deformation of a rolling tyre.

Piezoelectric materials are one of the promising energy harvesting technologies that can replace the battery and act as power source for sensors in the automotive field. Piezoelectricity is an effect that converts mechanical energy from the environment, i.e. vibration, motion, into electrical energy, which in turn can be stored and used to power electrical devices. During the movement of a vehicle, various mechanical effects are present in the tyre, for instance the deformation of the tread and sidewall of the tyre around the contact patch, and the changes in the tread due to periodic acceleration.

This provides the opportunity to extract electrical energy by using a piezoelectric material. During the rolling of a tyre, the inner liner in the contact area is in tension, while before and behind the contact patch the inner liner is in compression. Therefore, during the cyclic rotation of a tyre, a piezoelectric material mounted in the inner liner, is exposed to high strain values. Other effects associated with a rolling tyre are the vibrations from tyre-road interaction and gravitational effect.

There are two categories of piezoelectric materials, namely ceramic or polymer, which have very different and opposite characteristic properties. Piezoceramics are characterized by a high piezoelectric coefficient, which means they can generate a high amount of energy. However, their disadvantage is connected to a low elastic modulus and high weight, which make them incompatible to the elastomeric composites of the tyres. The other category is based on piezopolymers. Piezopolymers provide a higher elastic modulus but lower piezoelectric coefficient and therefore generated energy in comparison to piezoceramics.

Piezoelectric energy harvesters for replacing batteries and powering sensors in a tyre have been developed. US 2005/0110277 A1 and EP 1 650 057 A2 describes a system and method for generating electric power from a rotating tyre's mechanical energy. The piezoelectric material can be barium titanate, polyvinylidene fluoride (PVDF), lead zirconate titanate (PZT) crystals, or PZT fibers. In an embodiment the disclosed piezoelectric device corresponds to a fiber composite structure with a plurality of piezoelectric fibers embedded in an epoxy matrix. In other embodiments, the piezoelectric device includes a layer of piezoceramic material with respective conductive layers such as aluminum or stainless steel layers adhered to opposing sides thereof with a polyimide adhesive. Also, EP 1 598 219 A2 describes such a system for generating electric power from a rotating tyre's mechanical energy. The adhesive layers of the piezoelectric device have to hold the various layers of the device together and withstand the high mechanical stresses during manufacture and use of the device.

U.S. Pat. No. 8,035,502 B2 describes a tyre module with piezoelectric converter. The piezoelectric converter is configured for installation on an inside surface of the tyre and includes at least one elastically deformable region that is formed from piezoelectric material. The piezoelectric material may be PVDF.

U.S. Pat. No. 5,869,189 describes composites for structural control. The composites have a series of flexible, elongated piezoelectric fibers arranged in a parallel array with adjacent fibers separated by a soft deformable polymer. The polymer may be PVDF.

U.S. Pat. No. 6,992,423 B2 describes a vehicle tyre and system for generating electrical energy in the tyre. The system includes at least one piezoelectric element that generates electrical energy when deformed. The at least one piezoelectric element is associated with the tyre and is elongate. The at least one piezoelectric element extends along at least a portion of the tyre and is electrically connected to a electrical circuit. The electrical circuit is not in electrical communication with the vehicle. The tyre is mounted on a rim of the vehicle.

US20180337417 describes a polymer electrolyte membrane assembly which includes a polymer electrolyte membrane layer positioned between a first electrode and a second electrode. The electrodes comprise a conductive material and a binder material that may be polyvinylidene fluoride (PVDF). The polymer electrolyte membrane assembly can include a polymer matrix, a plasticizer and an ionic material and may be utilized to harvest electrical energy by allowing the polymer electrolyte membrane assembly to bend and produce a second ion concentration gradient different from an initial ion concentration gradient. The polymer electrolyte membrane assembly may be utilized in a tyre.

EP 1 993 857 B1 describes a tyre module with a piezoelectric transducer for attachment to an inner side of a tyre. The piezoelectric transducer comprises elastic bending regions which are formed with piezoelectric material that may be in the form of a piezoelectric film, in particular made of PVDF.

The present invention has the object to provide a piezoelectric energy harvester being capable of powering a tyre pressure monitoring system (TPMS).

This object is achieved by a vehicle tyre comprising a piezoelectric device according to claim 1. Advantageous embodiments are the subject of the dependent claims. They may be combined freely unless the context clearly indicates otherwise.

Accordingly, a vehicle tyre comprising a piezoelectric device is provided, the piezoelectric device comprising a layer of a piezoelectric polymer having first and second opposing sides, and a first and a second layer of an electrically conductive rubber composition provided adjacent to the first and second opposing sides of the layer of piezoelectric polymer.

In other words, the piezoelectric device comprises at least a first rubber layer and a second rubber layer, and a piezoelectric polymer layer provided between the first and second rubber layer in a sandwich-like configuration. The term "sandwich" or "sandwich-like" as used herein includes at least three layers that are connected in a planar manner of which at least one layer, such as the piezoelectric layer, is enclosed by two further layers, such as the rubber layers, in between. The piezoelectric device thus is a multi-layer piezoelectric device, particularly a three-layer device.

It has surprisingly been found that such a design of an energy-generating compound, mounted in a tyre is able to convert the mechanical energy from tyre rotation to sufficient amount of electrical energy to power a TPMS sensor. A piezoelectric polymer is used to obtain the energy from the mechanical movement of the tyre and a conductive rubber compound to transfer the generated electrical energy generated by the piezoelectric polymer to a storage capacitor particularly of a TPMS.

The term "electrically conductive rubber composition" refers to a rubber composition that is modified or manufactured to conduct electricity. This may be accomplished by distributing conductive particles such as carbon black or other electrically conductive carbon material throughout the rubber composition.

The most suitable piezoelectric materials to be applied in tyres for powering sensors are piezopolymers. The piezoelectric polymer may be selected from the group polyvinylidene_fluoride (PVDF) polymer, polyvinylidene fluoride-trifluoroethylene (P (VDF-co-TrFE)) copolymer, poly (vinylidene fluoride-co-hexafluoropropylene) (P (VDF-co-HFP)) copolymer, poly (vinylidene fluoride-co-chlorotrifluoroethylene) (P (VDF-co-CTFE)) copolymer, polyamides, liquid crystal polymers, poly (p-xylylene) (Parylene-C) and mixtures of these polymers. Polymers from the PVDF family, particularly the group of PVDF and P (VDF-co-TrFE), P (VDF-co-HFP), and P (VDF-co-CTFE) copolymers, are preferred. The piezoelectricity in this polymer class arises from the strong molecular dipoles within the polymer chain and from the resulting change of the dipole density upon application of a mechanical stimulus. Among the piezo-polymers, PVDF and its copolymer have the highest piezoelectric charge coefficients. The addition of trifluoroethylene (TrFE), hexafluoropropylene (HFP) and chlorotrifluoro-ethylene (CTFE) increases the amount of defects in the polymeric structure, which increases the polarity within the polymer and in turn the piezoelectric response.

A conductivity system is required to transport the electrical charges generated by the piezoelectric polymer to the sensor such as a capacitor of the TPMS. The electrically conductive rubber composition may have a volume resistivity of or below $10^7$ Ω·cm, preferably in a range of $\geq 9 \times 10^5$ Ω·cm to $\leq 10 \times 10^6$ Ω·cm, at a temperature of 20° C. (determined from DMA measurements according to ISO 6721-12, frequency 1-100 Hz, 0.25 MPa dynamic stress and 0.35 MPa static stress). Volume resistivity was determined at 20° C. based on DMA frequency sweep measurements according to ISO 6721-12 from 1 to 100 Hz under dynamic deformation. The electrically conductive rubber composition may have a volume resistivity in a range of $\geq 10^3$ Ω·cm to $\leq 10^7$ Ω·cm, preferably in a range of $\geq 3 \times 10^3$ Ω·cm to $\leq 20 \times 10^4$ Ω·cm, at a temperature of 90° C. (determined from DMA measurements according to ISO 6721-12, frequency 100 Hz, 0.25 MPa dynamic stress and 0.35 MPa static stress). Volume resistivity was determined based on DMA measurements according to ISO 6721-12 from 0° C. to 100° C. at 100 Hz under dynamic deformation. Volume resistivity is also called electrical resistivity. The volume resistivity of a material refers to how strongly a material opposes the flow of electric current through a volume of cubic specimen.

As the rubber component a diene rubber can be used alone or as a blend of two or more thereof. The electrically conductive rubber composition may comprise a diene rubber selected from the group of natural rubber (NR), isoprene rubber (IR), polybutadiene rubber (BR), styrene-butadiene rubber (SBR) or a mixture thereof. Preferred is a blend of natural rubber (NR) and polybutadiene rubber (BR).

The electrically conductive rubber composition may comprise a conductive component selected from the group of carbon black, single-wall carbon nanotubes (SWCNT) or multi-wall carbon nanotubes (MWCNT), graphene or a mixture thereof. Single or multi-wall carbon nanotubes and graphene also are referred to as nano-fillers. The conductive compound preferred in the design of the piezoelectric device is an elastomeric composition comprising carbon black and/or nano-fillers, e.g. single or multi-wall carbon nanotubes. Preferably, the rubber composition comprises carbon black and SWCNT.

The term "Single-wall carbon nanotubes" or "SWNTs" refers to a class of carbon materials known as one-dimensional materials. They are formed of sheets of graphene, rolled up to form hollow tubes with walls one atom thick. (SWCNTs) usually have diameters in the range of a nanometer. A range of SWNTs with different purities, lengths and wall types is commercially available. The term "multi-wall carbon nanotubes" or "MWCNTs" refers to a form of carbon nanotubes in which multiple single-walled carbon nanotubes are nested inside one another. A range of SWNTs with different diameters is commercially available. The term "graphene" refers to a two-dimensional carbon allotrope, wherein single layers of sp2-bonded carbon atoms are arranged in a hexagonal lattice.

The electrically conductive rubber composition may comprise single-wall carbon nanotubes (SWCNT) in a range of $\geq 0.01$ wt % to $\leq 2$ wt %, preferably a range of $\geq 0.1$ wt % to $\leq 0.6$ wt %, based on a total weight of 100 wt % of the conductive rubber composition. The first and second conductive rubber layers may comprise a rubber composition comprising at least one diene rubber, a carbon black filler and single wall carbon nanotubes in an amount in a range of $\geq 0.2$ wt % to $\leq 0.6$ wt %. For use in a rubber composition, SWCNT may be provided suspended in a rubber process oils such as treated distillate aromatic extracts (TDAE). Such mixtures may comprise 10 wt % SWCNT in TDAE. The rubber composition may comprise, per hundred parts by weight of rubber (phr), such as paste of SWCNT in TDAE in a range of $\geq 0.2$ phr to $\leq 40$ phr, preferably a range of $\geq 3.5$ phr to $\leq 12$ phr.

The electrically conductive rubber composition may comprise carbon black in a range of $\geq 1$ phr to $\leq 150$ phr, preferably a range of $\geq 50$ phr to $\leq 80$ phr.

The dimensions of the piezoelectric device and the thickness of the piezoelectric polymer layer rubber layers may vary. The piezoelectric polymer layer may have a thickness in a range of ≥0.02 mm to ≤0.25 mm, preferably of 0.1 mm. Commercially available piezoelectric polymer sheets may be used. PVDF films of a thickness of about 0.1 mm are commercially available, for example from PolyK Technologies.

The first and second layer of electrically conductive rubber composition may have a thickness in a range of ≥0.1 mm to ≤4 mm, preferably of 2 mm.

Preferably, the piezoelectric polymer and the conductive rubber are not adhered to each other by an adhesive. In embodiments, where PVDF is used as the piezoelectric polymer, the PVDF surface may be treated with oxygen plasma or other oxidizing agents including acids or bases for creating oxide groups on the surface which can react afterwards with a compound comprising thiocyanate groups, such as a silane silane comprising thiocyanate groups and ethoxy and/or methoxy groups. The thiocyanate groups then are able to crosslink the PVDF surface with a sulfur crosslinkable rubber.

Piezoelectric polymer and conductive elastomer preferably may be designed to be a patch that can be mounted inside a tyre at the inner liner either on the treadwall or sidewall. The vehicle tyre may be a non-pneumatic tyre, but preferably is a pneumatic tyre. In embodiments, an inner liner forms an interior surface of the tyre structure and the piezoelectric device is provided on the interior surface of the inner liner. The piezoelectric device may by attached to a treadwall portion and/or a sidewall portion of the inner liner. The piezoelectric device may be attached circumferentially along the treadwall portion of the inner liner. Preferably, the piezoelectric device is provided on the treadwall. Providing the piezoelectric device at the inner liner on the treadwall is a preferred position compared to positioning it at the sidewall, because the tyre tread is subjected to more intensive deformations than the sidewall. The piezoelectric device can have the form of a patch or a strip. One or more patches or a strip-type structure can run circumferential along the inner liner, for example along the treadwall portion and/or one or two sidewall portion(s) of the inner liner.

In alternative embodiments, at least one of the first and second layer of electrically conductive rubber may be provided by a rubber component of the tyre. For example, the inner liner of a tyre may be manufactured using the electrically conductive rubber composition. In embodiments, at least the first or the second layer of electrically conductive rubber composition may form the inner liner of the tyre. In other embodiments, the piezoelectric device forms the inner liner of the tyre. The piezoelectric device can thus substitute the inner liner in a tyre.

The present invention also relates to the use of the piezoelectric polymer and a conductive rubber compound to transfer the generated energy to a capacitor in TPMS. In embodiments, the tyre comprises a tyre pressure monitoring system (TMPS) sensor which is powered by the piezoelectric device.

If not specifically denoted otherwise, given % are weight-%. Weight percent, weight-% or wt-%, are synonyms and are calculated on the basis of a total weight of 100 weight % of the respective object, if not otherwise stated. The total amount of all components of the respective object does not exceed 100 wt.-%.

EXAMPLES

The invention will be further described with reference to the following examples and figures without wishing to be limited by them.

EXAMPLE 1: PREPARATION OF A PIEZOELECTRIC DEVICE

Figure 1:
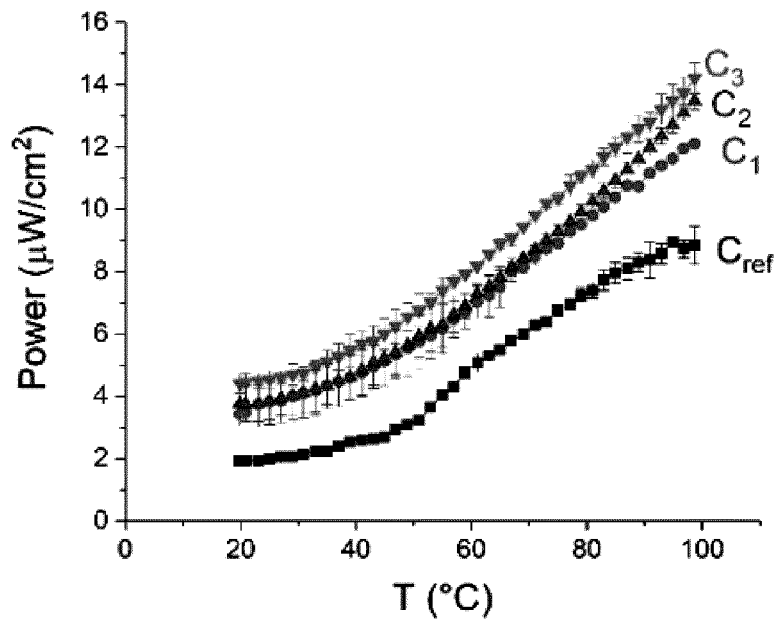
FIG. 1 shows the output power of the temperature sweep from the sandwich-like piezoelectric devices including a PVDF film and elastomeric materials comprising carbon black and SWCNTs in different ratios.

A piezoelectric device of sandwich configuration with a 0.1 mm piezoelectric polymer layer of PVDF film configured in between two sheets of 2.0 mm conductive rubber, resulting in a piezoelectric patch of about 4.1 mm thickness, was prepared.

1.1 Preparation of Piezoelectric Polymer Layer

The piezoelectric polymer PVDF was supplied from PolyK Technologies LLC, USA, in a form of thin film with A4 in size and a thickness of 100 m. The PVDF surface was cleaned by chloroform (99.5%, Sigma-Aldrich, St. Louis, MO) before treatment with oxygen plasma. The cleaned PVDF film was treated with an oxygen plasma treatment using a Plasma-Prep II (SPI Supplies, West Chester, USA) that contains a plasma vacuum chamber, in which the PVDF film was placed. At around 100-200 mTorr oxygen gas was pumped into the chamber and RF power at 13.56 MHz was applied to the chamber to excite and charge the oxygen molecules and create the oxygen plasma radicals. The PVDF film was continually treated for 15 minutes at room temperature (20±5° C.).

After oxygen treatment the PVDF was silanized with a thiocyanate based silane, namely 3-thiocyanatopropyltriethoxysilane (Si-264, Evonik Industries AG, Germany). For the silanization procedure, the PVDF film was exposed to 3 ml of silane S-264 in a desiccator under a vacuum atmosphere at room temperature for 24 hours.

1.2 Preparation of Conductive Rubber Layer

Non vulcanized rubber sheets of conductive rubber compositions $C_{ref}$, $C_1$, $C_2$ and $C_3$, were prepared according to the table 1 below:

TABLE 1

| Component: | $C_{ref}$ amount (phr) | $C_1$ amount (phr) | $C_2$ amount (phr) | $C_3$ amount (phr) |
|---|---|---|---|---|
| NR | 25 | 25 | 25 | 25 |
| SBR | 25 | 25 | 25 | 25 |
| BR | 50 | 50 | 50 | 50 |
| Filler | 60 | 60 | 60 | 60 |
| Processing oil | 14 | 14 | 14 | 14 |
| Curing agent | 10 | 10 | 10 | 10 |
| Anti Degradation agent | 7 | 7 | 7 | 7 |
| SWCNT/TDAE (10 wt % SWCNT in TDAE) | 0 | 4 | 8 | 12 |

The NR rubber used was TSR 20 grade.
The SBR rubber used was SBR 1502.
The BR rubber used was a Ni catalyzed Butadiene Rubber.
The filler used was carbon black N 330.

Abbreviations used are: TDAE (treated distillate aromatic extract; processing oil); SWCNT (Single Wall Carbon Nanotubes.

The mixture denoted $C_{ref}$ comprised carbon black as conductive component. In the three samples denoted $C_1$, $C_2$ and $C_3$, respectively, 2, 4 and 6 wt % (given as 4, 8 and 12 phr, respectively) of a paste of highly conductive nano-fillers comprising 10 wt % of Single Wall Carbon Nanotubes (SWCNT) in a low aromatic plasticizer (TDAE) was added to the mixture $C_{ref}$ via a two roll-mill to improve conductivity. For good dispersion of the nano-fillers, the compound was passed and rolled the mills for ten times.

1.3 Preparation of Piezoelectric Device

To prepare piezoelectric devices, the silanized PVDF film of step 1.1 was cured together with the layers of conductive rubber compound of step 1.2. The piezoelectric patches were fabricated in a sandwich configuration with a 0.1 mm thick PVDF film inserted in between two sheets of conductive rubber compounds comprising carbon black denoted of $C_{ref}$, and further carbon nanotubes comprising $C_1$, $C_2$ and $C_3$, respectively, and cured. The resulting cylindrical specimen had a sandwich-like configuration with a diameter of 10 mm and a thickness of 4.1 mm. In this configuration, the PVDF had a thickness of 0.1 mm, and the conductive material 2 mm thickness on the upper and lower side of PVDF. In the following, the resulting piezoelectric devices are denoted $C_{ref}$, $C_1$, $C_2$ and $C_3$ according to the respective conductive compounds.

Example 2: Determination of the Power Output of the Piezoelectric Devices Vs. Temperature The DMA (Dynamic Mechanical Analysis) technique is commonly used to analyse viscoelastic behaviours of polymeric materials by measuring stresses as a function of dynamic strains applied to the sample. Storage modulus, loss modulus and tan δ of the sample can be determined under variable parameters, i.e. temperatures, frequencies and strains. These analysing parameters are important to simulate the dynamic mechanical conditions of a particular rubber product, e.g. tyres. The voltage was measured under dynamic mechanical conditions simulated by a DMA in order to measure the piezoelectricity of the materials.

Temperature sweep in DMA performed in compression mode was used to monitor the viscoelastic behaviour and the generated energy of the piezoelectric energy harvesters $C_{ref}$, $C_1$, $C_2$ and $C_3$ obtained in example 1.3 under dynamic deformation. DMA temperature sweep was carried out according to ISO 6721-12 on a DMA Eplexor 9 (Netzsch Gabo Instruments GmbH, Germany) in compression mode using a Voltage Module NI. Copper plates with electrical wires were attached to the upper and lower part of the specimen in order to create a connection with electrical detection devices. For compression mode, the cylindrical specimen were placed in between the compression sample holders and subjected to compressive forces by an oscillating upper plate of the sample holders. The temperature test was carried out by varying the temperatures in a range of 0 to 100° C. at 100 Hz. With this setup, the voltage output (V) of the specimens over a shunt resistor with a load of 4.7 MΩ were monitored, to calculate the output power using a Ohm's law.

The FIG. 1 shows the power outputs of the sandwich-like piezoelectric devices denoted $C_{ref}$, $C_1$, $C_2$ and $C_3$, in the temperature range of 0 to 100° C. As can be taken from the FIG. 1, by increasing analysis temperatures, the electricity was remarkably increased. It is assumed that this is because elevated temperatures accelerate electrical interactions. Thus, the conductivity of the electrical conductive compound is better at higher temperatures, resulting in an increased electrical intensity generated. Further it can be seen that the piezoelectric patch with the conductive compound including 0.6 wt % of carbon nanotube provided the highest electricity generation at 100° C., which is the operating temperature inside a tyre during its rolling.

Example 3: Determination of the Power Output of the Piezoelectric Devices Vs. Frequency As a further analysis DMA frequency sweep was performed to monitor the viscolestic behaviour and the generated energy of the piezoelectric energy harvesters $C_{ref}$, $C_1$, $C_2$ and $C_3$ obtained in example 1.3 under dynamic deformation. DMA frequency sweep was carried out according to ISO 6721-12 on a DMA Eplexor 9 (Netzsch Gabo Instruments GmbH, Germany) in compression mode using a Voltage Module NI as described in example 2. For compression mode, the cylindrical specimen $C_{ref}$, $C_1$, $C_2$ and $C_3$ were placed in between the compression sample holders and subjected to compressive forces by an oscillating upper plate of the sample holders. The frequency test was carried out by varying the frequency in a range of 1-100 Hz at 20° C.

Figure 2:
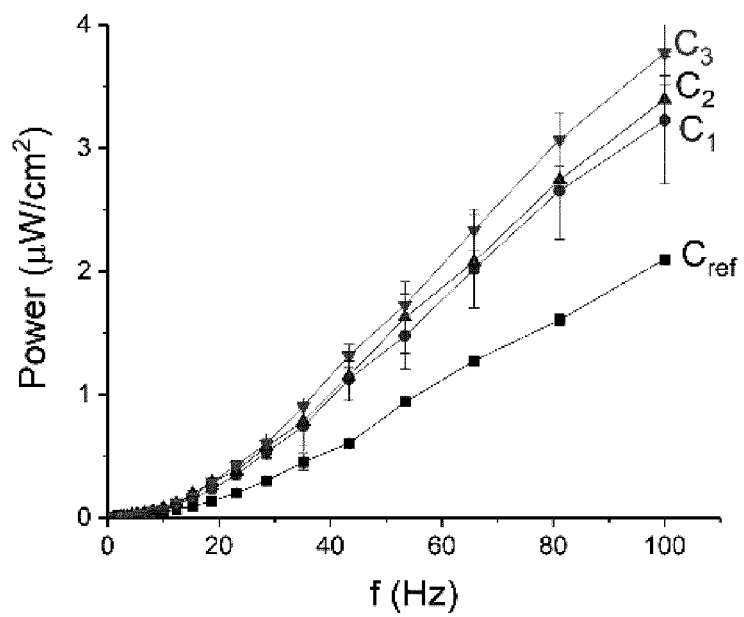
FIG. 2 shows the output power of the frequency sweep from the sandwich-like piezoelectric devices including a PVDF film and elastomeric materials comprising carbon black and SWCNTs in different ratios.

The FIG. 2 shows the output powers derived from the four sandwich-like piezoelectric devices denoted $C_{ref}$, $C_1$, $C_2$ and $C_3$, measured using a frequency range of 1 and 100 Hz. As can be taken from the FIG. 2, the power outputs of all samples increased with increasing frequency. Further it can be seen that the conductive compounds comprising carbon nanotubes showed an improved piezoelectricity compared to the device comprising only carbon black. Adding 6 wt % of the SWCNT/TDAE paste (10 wt % SWCNT in TDAE) showed the highest value of piezoelectricity.

This shows that the piezoelectric patch with the conductive compound including 0.6 wt % of carbon nanotube provided the highest electricity generation at 100 Hz, which is the vibration at which a piezoelectric device is subjected during the rolling tyre.

Example 4: Estimation of the Power Output of the Piezoelectric Device in a Car

The investigations of piezoelectric compounds of examples 2 and 3 reveal that it is highly promising to implement a piezoelectric system into a prototype tyre. The piezoelectric harvester was designed to have a sandwich-like configuration prepared from a piezo-polymer film with 0.1 mm thickness inserting in between the two layers of a conductive compound with 2 mm thickness. The output from the electrical harvester is in an alternating current (AC) waveform and has to be converted into a direct current (DC) signal by a rectifier, generating an effective current to the system. The generated electricity can be stored in a capacitor or a chargeable battery that can continually power the TPMS device installed in a tyre.

For the piezoelectric prototype the piezoelectric energy harvester $C_3$ obtained in example 1.3 was selected as this device provided the best properties in examples 2 and 3. The piezoelectric sandwich $C_3$ was glued with an amino-silicon sealant on the inner liner of treadwall inside a tyre.

A specific car was chosen as a reference to evaluate the efficiency of the piezoelectric sandwich. The reference car selected was a Volkswagen car, Golf series, with a total weight of 2100 kg, employing the tyres in P205/55R16 94R series. Under an assumption that the car is running at 80 km/h on average. With this driving condition, the revolution frequency is 11 Hz, and the estimated frequency due to tyre-road interactions is about 110 Hz. Moreover, the internal temperature of a rolling tyre can be built up from 80 to 100° C., depending on the weather or seasons.

For estimating the power output from the piezoelectric harvester, the analysing conditions with some assumptions were considered at a frequency of 100 Hz and a temperature of 90° C.

Figure 3:
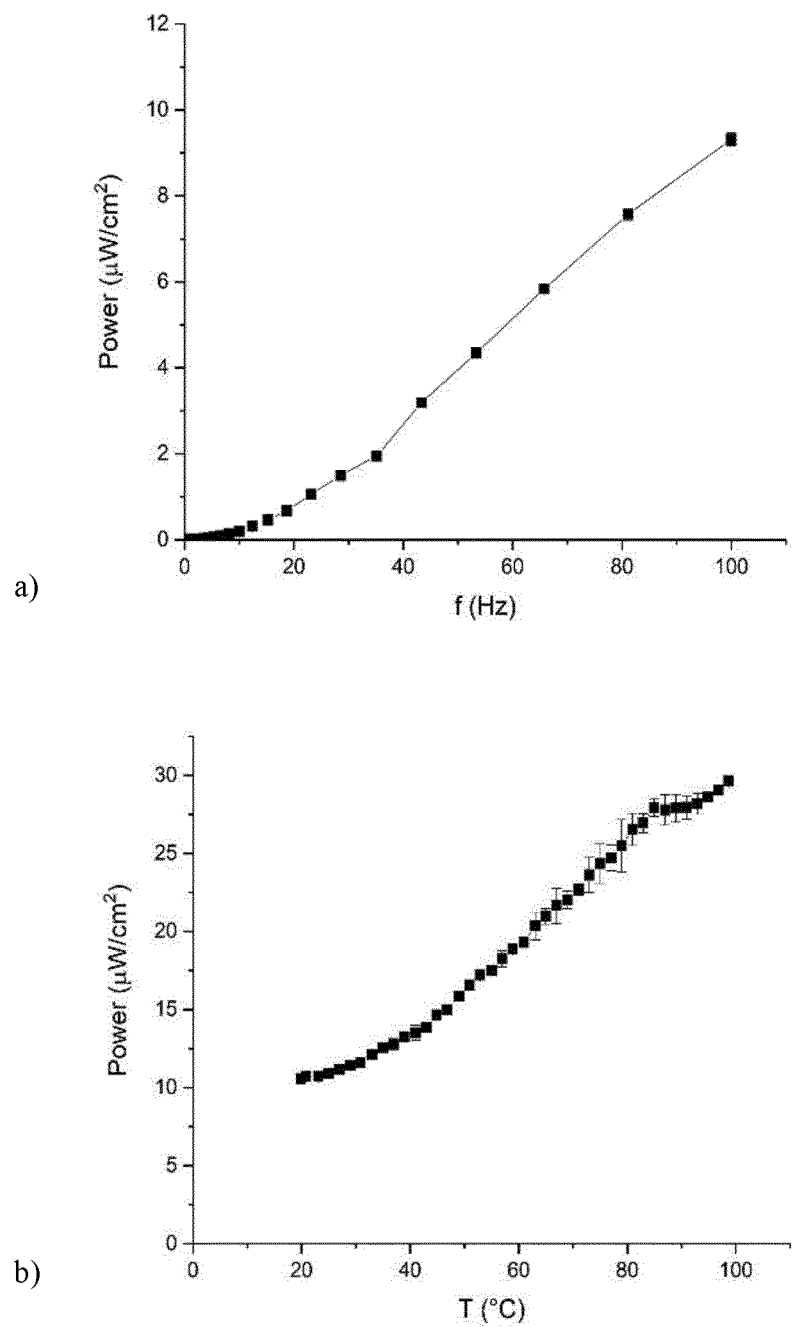
FIG. 3 shows the output power of the frequency sweep and the temperature sweep from the sandwich-like piezoelectric devices including a PVDF film and elastomeric materials comprising carbon black and 6% wt SWCNTs in FIG. 3a) and in FIG. 3b), respectively.

The FIG. 3 shows the output power generated by the piezoelectric sandwich patch $C_3$ analysed under the frequency sweep at 20° C. in FIG. 3a) and a temperature sweep at 100 Hz. These values were used for a calculation linking with the actual rolling conditions of the reference tyre.

As can be taken from the FIG. 3, at 100 Hz and 90° C. dynamic analyses, the output power from the piezoelectric patch $C_3$ produces 28 $\mu W/cm^2$. This shows that a sufficient amount of energy can be supplied to a TPMS sensor that needs 28 mW, when the piezoelectric patch $C_3$ has a surface area of 0.1 $m^2$, which can be installed inside the tyre, which is about 31.6×31.6 cm. This piezoelectric patch will generate electricity in a periodic manner by each revolution of the rolling tyre at the contact patch area, and the periodically generated electricity can be stored in a capacitor of the TPMS to ensure sufficient continual power supply to the system.

The invention claimed is:

1. A vehicle tyre comprising a piezoelectric device, characterised in that the piezoelectric device comprises
   a layer of a piezoelectric polymer having first and second opposing sides, and
   a first and a second layer of an electrically conductive rubber composition provided adjacent to the first and second opposing sides of the layer of piezoelectric polymer,
   wherein the piezoelectric polymer is selected from the group of polyvinylidene fluoride (PVDF) polymer or co-polymers and the electrically conductive rubber composition is based on a sulfur crosslinkable rubber component,
   wherein the PVDF surface is crosslinked to the electrically conductive rubber composition via a silane having thiocyante groups and ethoxy or methoxy groups, or having thiocyanate groups and ethoxy and methoxy groups.

2. The tyre according to claim 1, wherein the piezoelectric polymer is selected from the group of polyvinylidene fluoride (PVDF) polymer, polyvinylidene fluoride-trifluoroethylene (P (VDF-co-TrFE)) copolymer, poly (vinylidene fluoride-co-hexafluoropropylene) (P (VDF-co-HFP)) copolymer, poly (vinylidene fluoride-co-chlorotrifluoroethylene) (P (VDF-co-CTFE)) copolymer, and mixtures of these polymers.

3. The tyre according to claim 1, wherein the electrically conductive rubber composition comprises a diene rubber selected from the group of natural rubber (NR), isoprene rubber (IR), polybutadiene rubber (BR), styrene-butadiene rubber (SBR) or a mixture thereof.

4. The tyre according to claim 1, wherein the electrically conductive rubber composition comprises a conductive component selected from the group of single-wall carbon nanotubes, multi-wall carbon nanotubes, graphene, or a mixture thereof.

5. The tyre according to claim 1, wherein the electrically conductive rubber composition comprises single-wall carbon nanotubes in a range of $\geq$ 0.01 wt % to $\leq$2 wt %, preferably a range of $\geq$0.1 wt % to $\leq$0.6 wt %, based on a total weight of 100 wt % of the conductive rubber composition.

6. The tyre according to claim 1, wherein the electrically conductive rubber composition comprises carbon black in a range of $\geq$1 phr to $\leq$150 phr, preferably a range of $\geq$50 phr to $\leq$80 phr.

7. The tyre according to claim 1, wherein the piezoelectric polymer layer has a thickness in a range of $\geq$0.02 mm to $\leq$0.25 mm, preferably of 0.1 mm.

8. The tyre according to claim 1, wherein the first and second layer of electrically conductive rubber composition have a thickness in a range of $\geq$0.1 mm to $\leq$4 mm, preferably of 2 mm.

9. The tyre according to claim 1, wherein an inner liner forms an interior surface of the tyre structure and the piezoelectric device is provided on the interior surface of the inner liner.

10. The tyre according to claim 9, wherein the piezoelectric device is attached to a treadwall portion and/or a sidewall portion of the inner liner.

11. The tyre according to claim 9, wherein at least the first or the second layer of electrically conductive rubber composition forms the inner liner of the tyre.

12. The tyre according to claim 9, wherein the piezoelectric device forms the inner liner of the tyre.

13. The tyre according to claim 1, wherein the tyre comprises a tyre pressure monitoring system (TMPS) sensor which is powered by the piezoelectric device.

* * * * *